United States Patent
Akirav et al.

(10) Patent No.: US 9,582,223 B2
(45) Date of Patent: Feb. 28, 2017

(54) EFFICIENT RECLAMATION OF PRE-ALLOCATED DIRECT MEMORY ACCESS (DMA) MEMORY

(71) Applicant: INTERNATIONAL BUSINESS MACHINES CORPORATION, Armonk, NY (US)

(72) Inventors: Shay H. Akirav, Petach-Tikva (IL); Oren Bar, Rishon Lezion (IL); Roman Barsky, Natanya (IL); Itay Maoz, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 14/252,146

(22) Filed: Apr. 14, 2014

(65) Prior Publication Data
US 2015/0293841 A1    Oct. 15, 2015

(51) Int. Cl.
  *G06F 12/02*  (2006.01)
  *G06F 3/06*   (2006.01)
  *G06F 9/44*   (2006.01)
  *G06F 12/10*  (2016.01)

(52) U.S. Cl.
  CPC .......... *G06F 3/0683* (2013.01); *G06F 9/4401* (2013.01); *G06F 12/1081* (2013.01)

(58) Field of Classification Search
  CPC .. G06F 12/1081; G06F 12/109; G06F 3/0685; G06F 13/4081; G06F 12/00; G06F 9/4401; G06F 9/4406
  USPC ........................................................ 711/104
  See application file for complete search history.

(56) References Cited

U.S. PATENT DOCUMENTS

| | | | | |
|---|---|---|---|---|
| 5,560,031 | A  * | 9/1996  | Vankan ................. | G06F 13/385 711/149 |
| 6,385,689 | B1 * | 5/2002  | Cummins .............. | G11C 16/10 711/103 |
| 6,418,492 | B1   | 7/2002  | Papa et al. | |
| 7,949,814 | B2 * | 5/2011  | Chan .................... | G06F 13/4081 710/302 |
| 8,327,104 | B2 * | 12/2012 | Smith ....................... | G06F 1/08 711/154 |
| 2004/0250024 | A1 * | 12/2004 | Vogt ..................... | G06F 13/4234 711/131 |
| 2005/0005036 | A1   | 1/2005  | Bade et al. | |
| 2007/0074223 | A1   | 3/2007  | Lescouet et al. | |

(Continued)

OTHER PUBLICATIONS

Schopp, Joel et al, "Hotplug Memory Redux", (Jul. 2005) In Linux Symposium (pp. 151-174).*

(Continued)

*Primary Examiner* — Prasith Thammavong
*Assistant Examiner* — Alex Olson
(74) *Attorney, Agent, or Firm* — Griffiths & Seaton PLLC (57) ABSTRACT

For efficient reclamation of pre-allocated direct memory access (DMA) memory in a computing environment, hot-add random access memory (RAM) is emulated for a general purpose use by reclamation of pre-allocated DMA memory reserved at boot time for responding to an emergency by notifying a non-kernel use device user that the non-kernel use device has a smaller window, stopping and remapping to the smaller window, and notifying a kernel that new memory has been added, wherein the new memory is a region left after the remap.

17 Claims, 5 Drawing Sheets

(56) References Cited

U.S. PATENT DOCUMENTS

| | | | |
|---|---|---|---|
| 2007/0083681 A1 | 4/2007 | Bartley et al. | |
| 2007/0136554 A1 | 6/2007 | Biran et al. | |
| 2008/0177935 A1* | 7/2008 | Lasser | G06F 12/0246 711/103 |
| 2008/0215871 A1* | 9/2008 | Chan | G06F 13/4081 713/2 |
| 2009/0119498 A1* | 5/2009 | Narayanan | G06F 9/4401 713/2 |
| 2010/0077128 A1* | 3/2010 | Stansell | G06F 9/5016 711/6 |
| 2010/0241821 A1* | 9/2010 | Barde | G06F 9/441 711/173 |
| 2010/0250868 A1* | 9/2010 | Oshins | G06F 12/0284 711/154 |
| 2012/0317331 A1* | 12/2012 | Broas | G06F 9/45558 711/6 |
| 2013/0013877 A1* | 1/2013 | Tian | G06F 12/1081 711/165 |
| 2013/0138856 A1* | 5/2013 | Liao | G06F 13/00 710/302 |
| 2013/0185470 A1* | 7/2013 | Yu | G06F 13/4081 710/302 |
| 2013/0185471 A1* | 7/2013 | Yu | G06F 13/4081 710/302 |

OTHER PUBLICATIONS

M. W. Rolund, J. T. Beckett and D. A. Harms, "The 3B20D Processor & DMERT operating system: 3B20D Central Processing Unit," in The Bell System Technical Journal, vol. 62, No. 1, pp. 191-206, Jan. 1983. doi: 10.1002/j.1538-7305.1983.tb04390.x.*

Trust and Trustworthy Computing vol. 6101 of the series Lecture Notes in Computer Science pp. 141-165, Requirements for an Integrity-Protected Hypervisor on the x86 Hardware Virtualized Architecture.*

Moreno et al., "Customer-aware resource overallocation to improve energy efficiency in realtime Cloud Computing data centers"pp. 1, 8, 12-14, 2011 IEEE International Conference on Service-Oriented Computing and Applications (SOCA).

Zhai et al, "Live migration with pass-through device for Linux VM."pp. 261-268, In OLS'08:, The 2008 Ottawa Linux Symposium, 2008.

* cited by examiner

EFFICIENT RECLAMATION OF PRE-ALLOCATED DIRECT MEMORY ACCESS (DMA) MEMORY

BACKGROUND OF THE INVENTION

Field of the Invention

The present invention relates in general to computers, and more particularly to efficient reclamation of pre-allocated direct memory access (DMA) memory in a computing environment.

Description of the Related Art

In today's society, computer systems are commonplace. Computer systems may be found in the workplace, at home, or at school. A data processing system typically includes a processor subsystem having at least one central processing unit (CPU), an input/output (I/O) subsystem, a memory subsystem and a bus subsystem. These data processing systems may include data storage systems, or disk storage systems, to process and store data. Many of these computer systems include virtual storage components and computing clusters. Computing clusters and virtual storage components are found in a variety of computing environments.

Large amounts of data have to be processed daily and the current trend suggests that these amounts will continue being ever-increasing in the foreseeable future. For the most part, computing systems face a significant challenge to meet the increasingly stringent reliability demands and while providing complex and sophisticated data storage systems. In many modern computing data storage/processing systems, certain hardware data subsystems within the computer are allowed to access and use memory independently of the central processing unit (CPU), which is referred to as direct memory access (DMA). Accordingly, it would be desirable to improve computing efficiency within the data storage systems to add physical memory, in a DMA hardware infrastructure, that may be required for high availability servers without compromising reliability and data availability.

SUMMARY OF THE DESCRIBED EMBODIMENTS

In one embodiment, a method is provided for efficient reclamation of pre-allocated direct memory access (DMA) memory, in a computing environment. In one embodiment, by way of example only, emulating a hot-add random access memory (RAM) for a general purpose use by reclamation of pre-allocated DMA memory reserved at boot time for responding to an emergency by notifying a non-kernel use device user that the non-kernel use device has a smaller window, stopping and remapping to the smaller window, and notifying a kernel that new memory has been added, wherein the new memory is a region left after the remap.

In another embodiment, a computer system is provided for efficient reclamation of pre-allocated direct memory access (DMA) memory, in a computing environment. The computer system includes a computer-readable medium and at least one processor in operable communication with the computer-readable medium. The processor emulates a hot-add random access memory (RAM) for a general purpose use by reclamation of pre-allocated DMA memory reserved at boot time for responding to an emergency by notifying a non-kernel use device user that the non-kernel use device has a smaller window, stopping and remapping to the smaller window, and notifying a kernel that new memory has been added, wherein the new memory is a region left after the remap.

In a further embodiment, a computer program product is provided for efficient reclamation of pre-allocated direct memory access (DMA) memory, in a computing environment. The computer-readable storage medium has computer-readable program code portions stored thereon. The computer-readable program code portions include a first executable portion that emulates hot-add random access memory (RAM) for a general purpose use by reclamation of pre-allocated DMA memory reserved at boot time for responding to an emergency by notifying a non-kernel use device user that the non-kernel use device has a smaller window, stopping and remapping to the smaller window, and notifying a kernel that new memory has been added, wherein the new memory is a region left after the remap.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

In a multiprocessor design, a direct memory access (DMA) mechanism is used to move information from one type of memory to another. The DMA mechanism such as a DMA engine or DMA controller also moves information from a system memory to a local store of a processor. More specifically, the DMA controller may be used to transfer blocks of data between an input/output (I/O) device and consecutive locations in the system memory. The direction of data transfer can be from the I/O device to memory, or vice versa.

Without DMA, when the CPU is using programmed input/output, it is typically fully occupied for the entire duration of the read or the write operation, and is thus unavailable to perform other work. With DMA, the CPU initiates the transfer, does other operations while the transfer is in progress, and receives an interrupt from the DMA controller when the operation is done. This feature is useful any time the CPU cannot keep up with the rate of data transfer, or where the CPU needs to perform useful work while waiting for a relatively slow I/O data transfer. Hardware systems may use DMA, including disk drive controllers, graphics cards, network cards and sound cards. DMA is also used for intra-chip data transfer in multi-core processors. Computers that have DMA channels can transfer data to and from devices with much less CPU overhead than computers without DMA channels. Similarly, a processing element inside a multi-core processor can transfer data to and from its local memory without occupying its processor time, allowing computation and data transfer to proceed in parallel. DMA can also be used for "memory to memory" copying or moving of data within memory. DMA can offload expensive memory operations, such as large copies or scatter-gather operations, from the CPU to a dedicated DMA engine.

The physical devices in certain computing architectures (e.g., PC-compatible computers) require DMA-able memory during for high-performance operation. The DMA-able memory means that the physical RAM is continuous in its physical addresses. Usually such buffers are allocated within the kernel using special functions that return an array of physically continuous pages. The problem is that for large requirements DMA-able memory allocation may fail due to RAM fragmentation. To solve this problem a large number of smaller buffers may be allocated. This approach better withstands the fragmentation, but may suffer from a deficiency in performance due to increased interrupt request (IRQ) rate; also it may not be supported by peripheral hardware that requires a specific buffer size. Another solution may be for the DMA engine to use virtual and not physical addresses for a DMA operation. One of the main drawbacks is a requirement for special hardware on the motherboard and/or CPU. Also, not all the peripherals support this mode of DMA operation. An additional solution may be allocating the memory using "alloc_bootmem*" routines, which run just after the kernel starts initializing. In other words, the alloc_bootmem command is a specialized command to allocate memory at boot up. This approach requires the driver to be compiled into the kernel, which is not always feasible, and does not guarantee the success of the allocation, though highly increases it. In one embodiment, a solution may be for using the command-line parameters to the kernel, specify a range of memory as input-output memory region. The kernel will not use this region of the memory, as it assumes this is not a regular random access memory (RAM), but memory-backed peripheral; and the driver may remap the memory for the use of DMA. The main benefit of this approach is assured success of a large DMA-able memory allocation, and in reality is the only guaranteed way to provide a large DMA-able allocation. Yet, one major drawback is an inability to reuse this memory for the other uses (e.g., memory that may be used for general purpose uses other than memory reserved for large requirements of DMA-able memory allocation that may fail due to RAM fragmentation). As such, a need exists for reusing memory (e.g., RAM) that was reserved at boot time and now this reserved memory at boot time may be reused for the other uses (e.g., memory that may be used for general purpose uses).

With the enterprise-level servers getting more and more sophisticated, the need for extended serviceability becomes a must requirement. Servers that perform online real-time processing of data may usually not afford swapping, and all the memory usage should be predesigned and scrupulously calculated. If, however, there is a run-time need to increase the amount of available RAM, parts of I/O buffers may be reused, trading the performance of the specific I/O device off. This flexibility is required for high-availability servers, and constitutes a very important tool for support personnel.

In addition, a memory controller integrated circuit (IC) may enable to execute a hot-add memory operation, which is the adding of physical memory module to a running computer system. The hot-add memory may be used specifically in a Linux kernel, which us currently implemented and used for 1) supporting real RAM memory being inserted while the system is up (online), 2) supporting an online increase of the available RAM in virtual machines (e.g., the host machine allocates a block of memory for the specific virtual machine, and signals this event to the guest OS, and 3) accepting the signal by a special driver in the guest operating system (OS), and commences the RAM discovery mechanism. Moreover, the present invention provides for a new use of hot-add RAM. Emulating hot-add RAM is exercised to reclaim the pre-allocated DMA-able memory for generic use for guaranteeing the allocation of the DMA-able memory of any size, while keeping the flexibility of the preallocated memory reuse for general purpose, particularly for the sake of serviceability of high-availability servers. The solution enables for reducing the server downtime comparing to an existing solution, which requires changing the preallocation scheme and rebooting the OS kernel. As used herein, the generic use means any allocation for the use by kernel, the drivers, or user-space application. An example of special purpose use is, for example, memory-mapped I/O, reserved DMA-able memory. Common feature of "special use" in this context is not taking part of the special use memory in allocations for the kernel, drivers, and user-space applications.

In other words, emulating hot-add RAM may be described as follows. When a buffer is reserved in the way as described above, the kernel does not see the addresses pertaining to this buffer as memory. For example, if there are reserved 4 GB in the computing system with 24 GB of RAM, the kernel only knows 20 GB while the other 4 GB are not a memory from kernel's point of view. The kernel is unable to access this memory, unable to map the memory to virtual addresses, and the like. Now assume it is decided to pass 1 GB out of the 4 GB to the kernel. It is done by emulating the hot-add memory: a continuous buffer 1 GB is freed by the driver, and then signaling the kernel that a new (physical) RAM was added starting with the start of 1 GB buffer and with the length of 1 GB. The latter operation emulates the addition of real physical memory to the system, as the kernel may not distinguish between this case, and the case when a real RAM chip is added to the system. The kernel would react to this signal by sensing the memory and adding it to the pool where the 20 GB already reside (resulting now in 21 GB of usable memory).

In one embodiment, efficient reclamation of pre-allocated direct memory access (DMA) memory using hot-add random access memory (RAM), in a computing environment, is a achieved by using hot-add RAM for a general purpose use by reclamation of pre-allocated DMA memory reserved at boot time for responding to an emergency by notifying a user of a non-kernel use device (e.g., a memory-mapped I/O device or "dev") that the non-kernel use device has a smaller window, stopping and remapping to the smaller window, and notifying a kernel that new memory has been added, wherein the new memory is a region left after the remapping operation.

Figure 1:
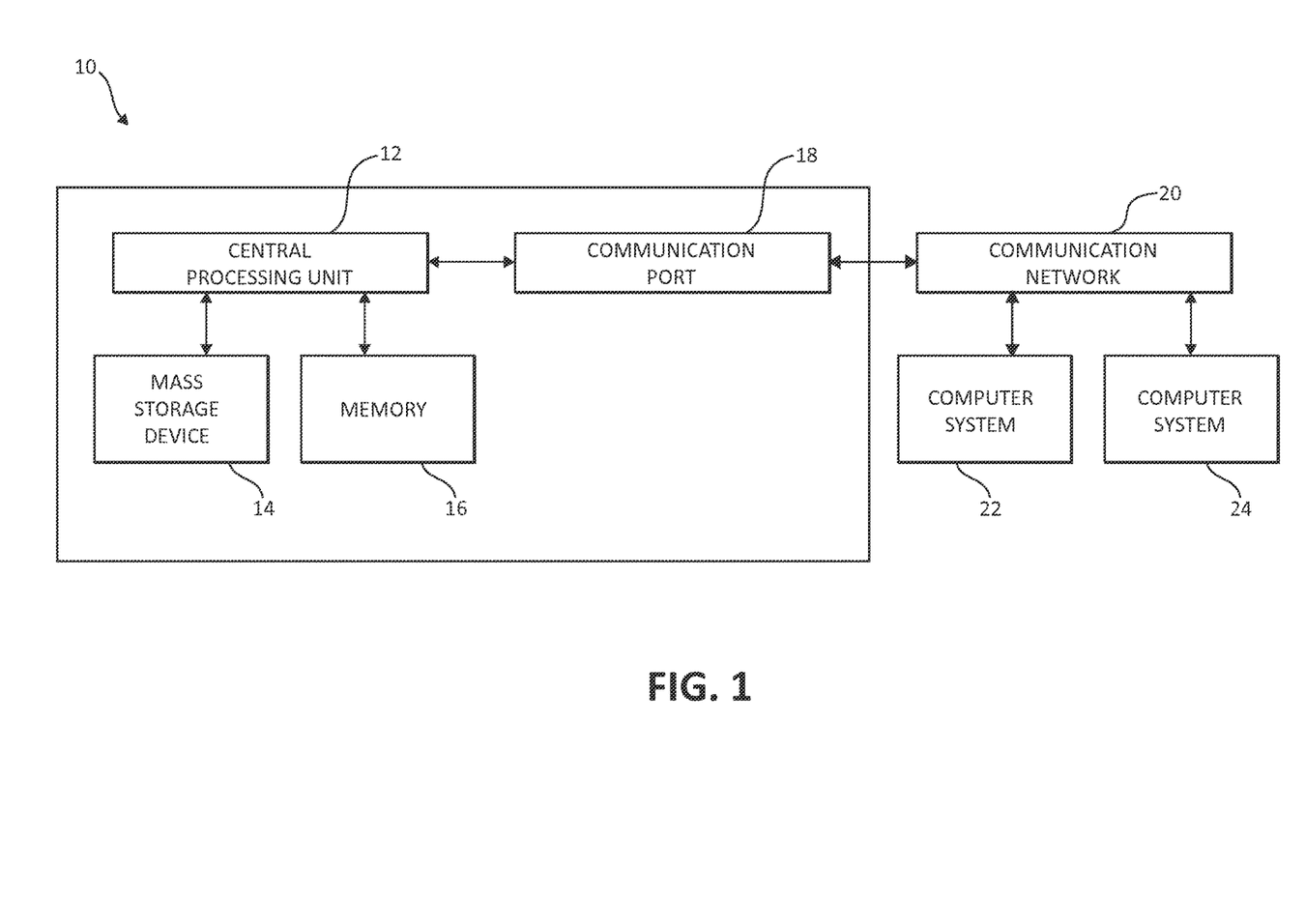
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
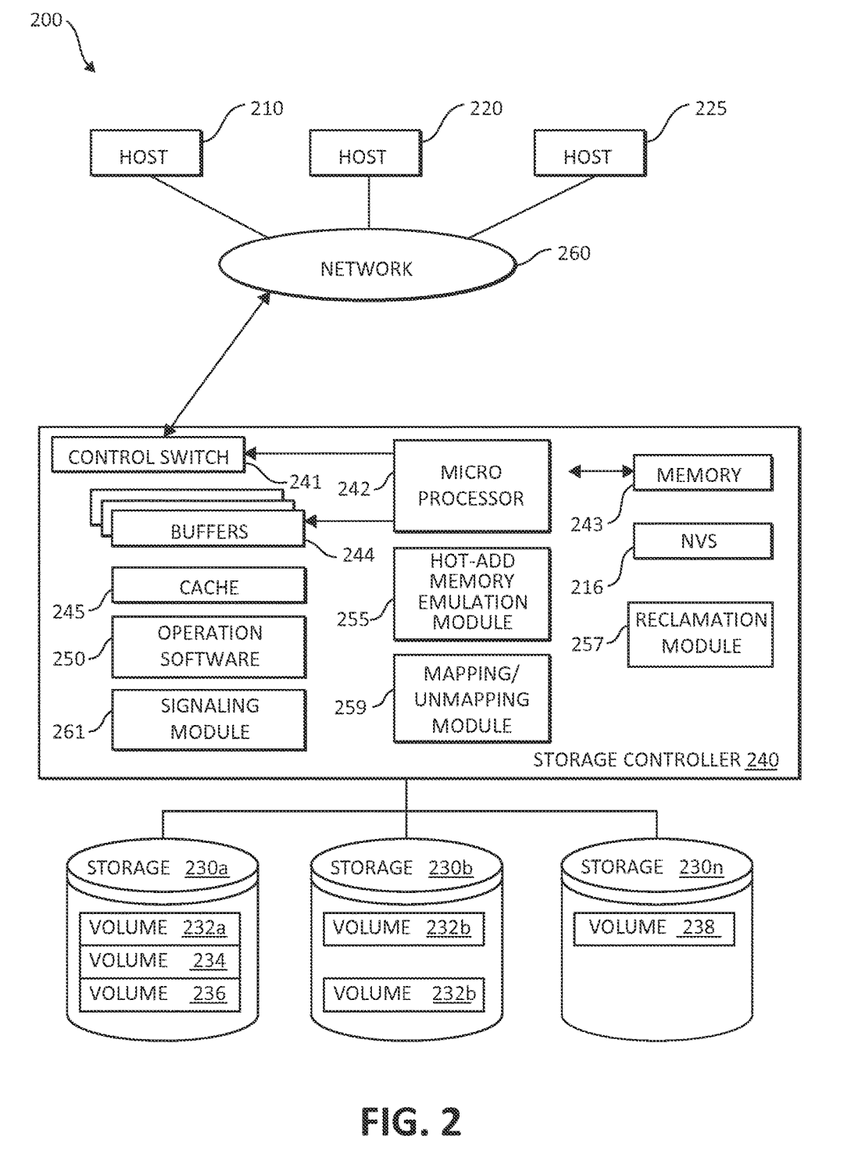
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™ and/or the IBM® TS3500™ Tape Library. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include, be associated with, and/or in communication with a hot-add memory (e.g., RAM memory) module 255 (e.g., a hot-add memory RAM memory emulation module 255), a reclamation module 257, a mapping/unmapping module 259, and a signaling module 261 (it should be noted that the hot-add RAM is only emulated, therefore the storage controller may or may not include hot-add RAM). The hot-add memory module 255, the reclamation module 257, the mapping/unmapping module 259, and the signaling module 261 may work in conjunction with each and every component of the storage controller 240, the hosts 210, 220, 225, and storage devices 230. The hot-add memory module 255, the reclamation module 257, the mapping/unmapping module 259, and the signaling module 261 may be structurally one complete module or may be associated and/or included with other individual modules. The hot-add memory module 255, the reclamation module 257, the mapping/unmapping module 259, and the signaling module 261, may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the hot-add memory module 255, the reclamation module 257, the mapping/unmapping module 259, and the signaling module 261, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the hot-add memory module 255, the reclamation module 257, the mapping/unmapping module 259, and the signaling module 261 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the hot-add Memory module 255, the reclamation module 257, the mapping/unmapping module 259, and the signaling module 261, may also be located in the cache 245 or other components. As such, one or more of the hot-add Memory module 255, the reclamation module 257, the mapping/unmapping module 259, and the signaling module 261, maybe used as needed, based upon the storage architecture and users preferences.

Figure 3:
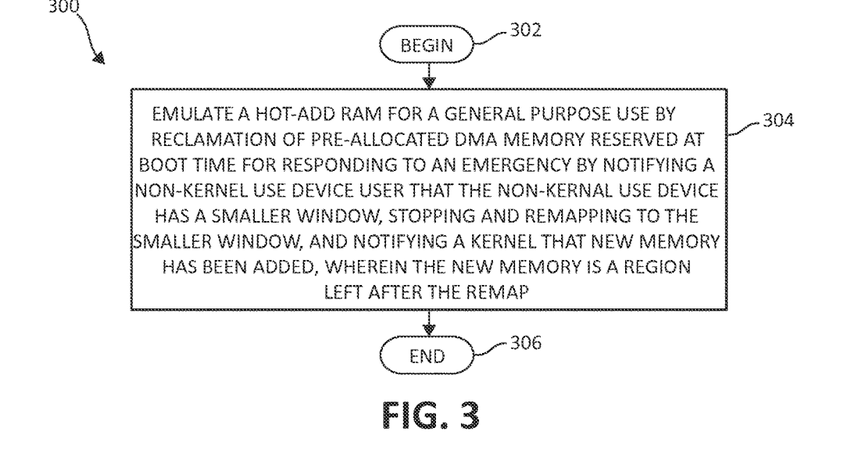
FIG. 3 is a flowchart illustrating an exemplary method for efficient reclamation of pre-allocated direct memory access (DMA) memory using hot-add random access memory (RAM) in which aspects of the present invention may be realized.

FIG. 3 is a flowchart illustrating an exemplary method 300 for efficient reclamation of pre-allocated direct memory access (DMA) memory using hot-add random access memory (RAM) in which aspects of the present invention may be realized. The method 300 begins (step 302) by emulating a hot-add RAM for a general purpose use by reclamation of pre-allocated DMA memory reserved at boot time for responding to an emergency by notifying a non-kernel use device user that the non-kernel use device has a smaller window, stopping and remapping to the smaller window, and notifying a kernel that new memory has been added, wherein the new memory is a region left after the remap (step 304). The method 300 ends (step 306).

Figure 4:
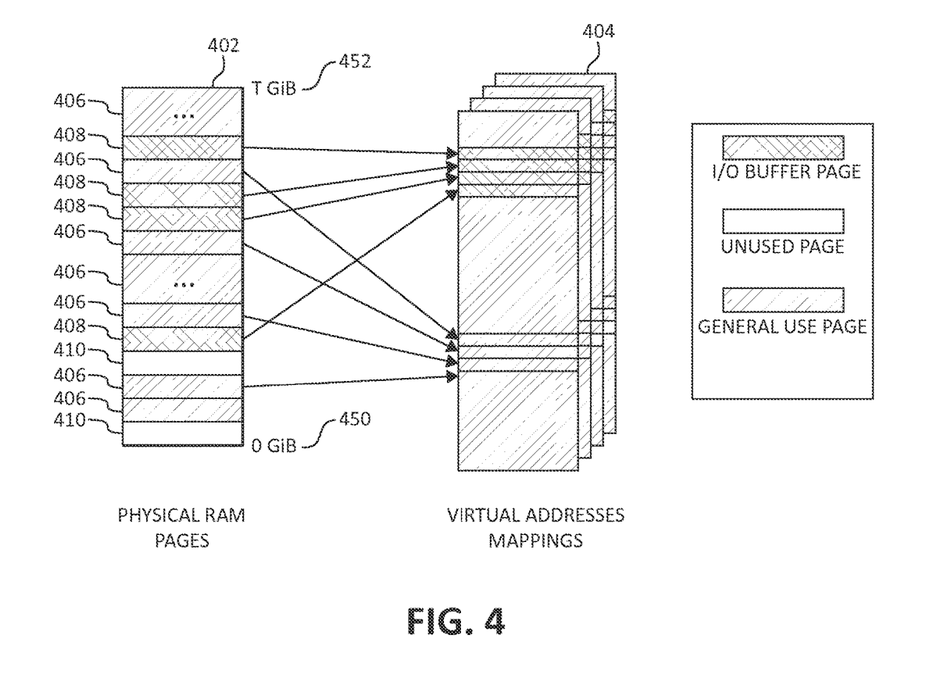
FIG. 4 is a block diagram illustrating a hardware structure of a physical memory with regions in which aspects of the present invention may be realized.

FIG. 4 is a block diagram illustrating a hardware structure of a physical memory with regions in which aspects of the present invention may be realized. FIG. 4 illustrates the memory map before reclamation of pre-allocated direct memory access (DMA) memory using hot-add memory feature. The physical memory with regions show physical RAM pages 402 with general use pages (e.g., general purpose use) pages 406, I/O buffer pages 408, and unused pages 410. A corresponding virtual address mapping structure 404 is illustrated showing the virtual address mappings of the corresponding general use pages 406, I/O buffer pages 408, and unused pages 410 as mapped to the virtual addresses 404. The total size of memory is T GiB (e.g., gigabyte that is $2^{30}$ bytes) 452 starting from the base offset of 0 GiB 450.

Figure 5:
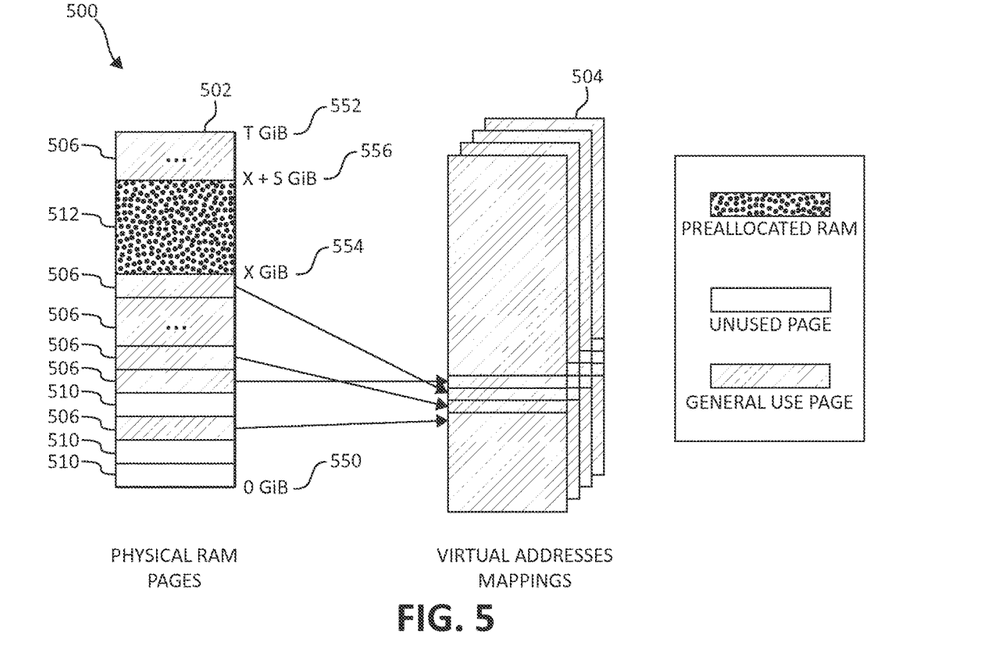
FIG. 5 is a block diagram illustrating a hardware structure of memory map with boot-time reserved region in which aspects of the present invention may be realized.

FIG. 5 is a block diagram illustrating a hardware structure of memory map with boot-time reserved region in which aspects of the present invention may be realized. Using the hardware structure of a physical memory with regions from FIG. 4, the physical memory 504 with regions show physical RAM pages 502 with general use pages (e.g., general purpose use) pages 506, preallocated RAM 512, and unused pages 510. A corresponding virtual address mapping structure 504 is illustrated showing the virtual address mappings of the corresponding general use pages 506, preallocated RAM 512, and unused pages 510 as mapped to the virtual addresses 504. The total size of memory is T GiB (e.g., gigabyte) 552 starting from the base offset of 0 GiB 550. A command line parameter designated as "memmap=S$X" is used and the kernel is directed to assume "S" GiB, where S is a variable, starting at offset "X" (X+S is the address; the size is indeed S and the offset of the initial byte in the region X) as memory-mapped I/O device, which is designated for illustration purposes as "dev"). At this point, FIG. 5 illustrates this memory layout showing the memory map with a boot-time reserved region (shown as the space of X GiB 554 plus X+S GiB 556). The kernel sees only the used pages for general use 506 and the unused pages for general use 510 of physical memory 504.

The kernel boots, utilizing all the memory except the boot-time reserved region (S GiB 556 starting at offset X GiB 554). After that, a driver for the I/O device that requires the DMA loads (usually as a kernel module), and remaps the reserved RAM region (S GiB 556 starting at offset X GiB 554) for the use of DMA, and into the virtual address space 506. Then the driver configures the I/O device's DMA to use buffers from the reserved region (S GiB 556 starting at offset X GiB 554).

Figure 6:
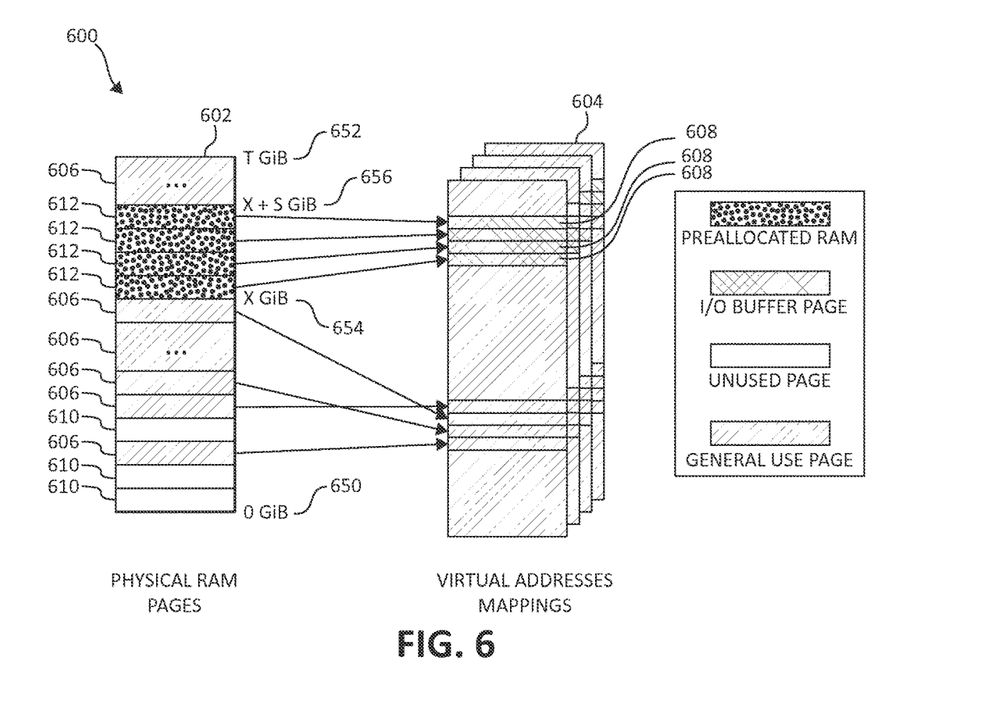
FIG. 6 is a block diagram illustrating a hardware structure of a memory map after a device driver is loaded in which aspects of the present invention may be realized.

FIG. 6 is a block diagram illustrating a hardware structure of a memory map after a device driver is loaded in which aspects of the present invention may be realized. FIG. 6 illustrates the state of the server at the normal operation. The physical memory with regions shows physical RAM pages 602 with general use pages (e.g., general purpose use) pages 606, preallocated RAM 612, and unused pages 610. A corresponding virtual address mapping structure 604 is illustrated showing the virtual address mappings of the corresponding general use pages 606, I/O buffer pages 608, and unused pages 610 as mapped to the virtual addresses 604. The total size of memory is T GiB (e.g., gigabyte) 652 starting from the base offset of 0 GiB 650.

The memory-mapped I/O device's (e.g., non-kernel use device or "dev") DMA uses S GiB 656 (starting at offset X GiB 654) of RAM, and the kernel utilizes T-S GiB (e.g., T GiB 652 minus S GiB 656) or all the other purposes (e.g., General Purpose Memory "GPM" which is general purpose memory, contrary to IO buffers). S GiB 656 starting at offset X GiB 654, and this is the reserved region.

In other words, after a device driver is loaded, the preallocated pages of the physical RAM pages are now mapped to the virtual addresses within the processors memory space. The I/O buffer pages 608 in the virtual memory address, which is the same continuous memory in the physical RAM, may be accessed (e.g., read or write) by a software application, and hardware devices may access the physical memory. The hardware devices may access the physical pages; due to existing physical to virtual addresses mapping, the latter is reflected in virtual space. For example, if a physical page with address 0x1000 (mapped to virtual address 0x5000) is written by hardware device, the software may read the change at virtual address 0x5000. The hardware device is unaware of virtual addresses.

Figure 7:
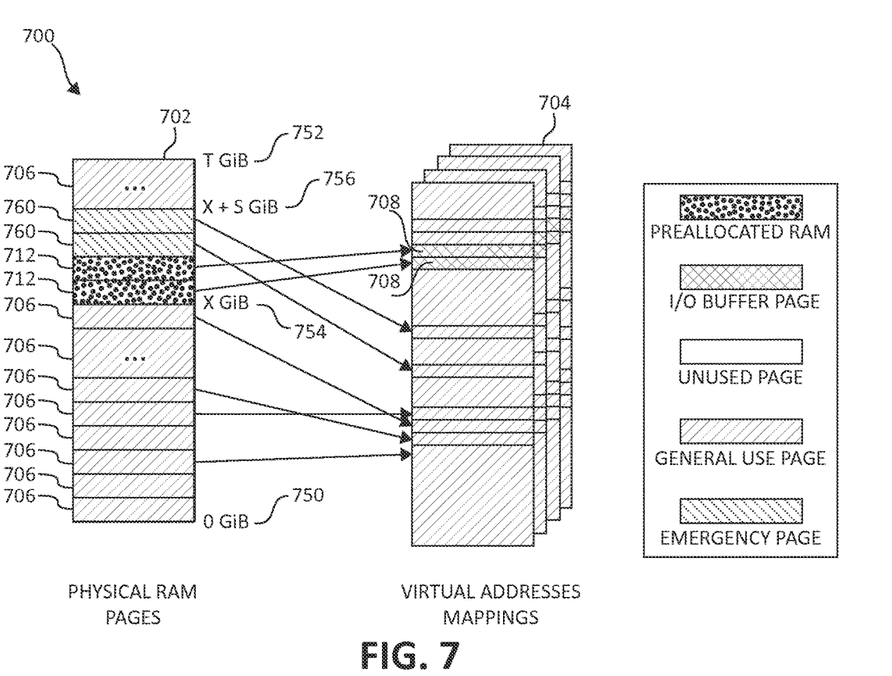
FIG. 7 is a block diagram illustrating a hardware structure of a memory map after part of the preallocated memory was reclaimed in which aspects of the present invention may be realized.

FIG. 7 is a block diagram illustrating a hardware structure 700 of a memory map after part of the preallocated memory was reclaimed in which aspects of the present invention may be realized. The physical memory with regions shows physical RAM pages 702 with general use pages (e.g., general purpose use) pages 706, preallocated RAM 712, and unused pages 710. A corresponding virtual address mapping structure 704 is illustrated showing the virtual address mappings of the corresponding general use pages 706, I/O buffer pages 708, and unused pages 710 as mapped to the virtual addresses 704. The total size of memory is T GiB (e.g., gigabyte) 752 starting from the base offset of 0 GiB 750. In other words, FIG. 7 illustrates that preallocated memory (e.g., the emergency page 760) is now released for general use 706 (e.g., the General Purpose Memory) and is mapped to the virtual addresses 704 that may be for general use 706, and this released region 760 is unrelated to the I/O buffer pages 708 and is no longer mapped to the I/O buffer 708 (compare FIG. 7 to FIGS. 5 and 6).

In case of an emergency, which requires urgent addition of GPM on account of I/O buffers, the following sequence is performed. Assuming a requirement to add "F" GiB (shown in FIG. 7 as 760) of GPM, such that F is less than S (e.g., F<S), S is illustrated as "S GiB" or X+S GiB 756, which starts at offset X GiB 754). First, the application or service that requires operation of the non-kernel use device is stopped. Second, a device driver stops the operation of the hardware device that uses a DMA-able memory. The driver unmaps a buffer from the kernel virtual memory system. The driver unmaps a buffer from the kernel virtual memory system. The driver splits S GiB of the buffer into two continuous parts: S' and F; and S GiB equal S' plus F (represented in equation for as S=S'+F and F is region 760. The driver remaps S'GiB for the use of dev's DMA (e.g., the non-kernel use device's DMA). The driver signals the kernel that a new memory was hot-added to the system, pointing to F. The kernel scans the new memory region F GiB 760, perceives the new memory as newly added RAM, and adds the new memory to the GPM pool, or all the other purposes (e.g., General Purpose Memory "GPM"). At this stage the dev's buffer is of size S−F, and the size of GPM is T GiB minus the S Gig plus the F GiB (in equation form the GPM=T−S+F (e.g., T GiB 752 plus the new F GiB 760 of memory). The driver reconfigures the dev with the new DMA buffer S'. The application or service requiring the operation of dev is restarted.

In one embodiment, for efficient reclamation of preallocated direct memory access (DMA) memory using hot-add random access memory (RAM) hot-add memory (e.g., RAM) for a general purpose use by reclamation of preallocated DMA memory reserved at boot time for responding to an emergency by notifying a memory-mapped I/O device (e.g., non-kernel use device or "dev") that the non-kernel use device has a smaller window, stopping and remapping to the smaller window, and notifying a kernel that new memory has been added, wherein the new memory is a region left after the remap.

In one embodiment, in case of the emergency, performing at least one of: stopping the application requiring the non-kernel use device, stopping operations of the non-kernel use device by a device driver, and/or unmapping a buffer from a kernel virtual mapping system.

In one embodiment, the hot-add RAM is split into at least two continuous parts. The hot-add RAM is a physical memory that is being inserted to the physical system when the latter is running (thus "HOT-add").

In one embodiment, at least one of the two continuous parts of the hot-add RAM is remapped for use by DMA memory of the non-kernel use device, wherein the new memory is at least one of the two continuous parts.

In one embodiment, the kernel is signaled (e.g., a notification is sent) of the addition of the hot-add RAM.

In one embodiment, the present invention performs at least one of: scanning the at least one of the two continuous parts of the hot-add RAM by the kernel, perceiving that the least one of the two continuous parts of the hot-add RAM is newly added, and/or adding the least one of the two continuous parts of the hot-add RAM to a pool of general purpose memory. In one embodiment, the present invention performs at least one of: configuring the non-kernel use device with the buffer of the least one of the two continuous parts of the hot-add RAM, and restarting the application-requiring a memory-mapped I/O device.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient reclamation of pre-allocated direct memory access (DMA) memory using a processor device in a computing environment, the method comprising:
    emulating a hot-add RAM for a general purpose use by reclamation of pre-allocated DMA memory reserved at boot time by notifying a non-kernel use device user that the non-kernel use device has a smaller window, stopping and remapping to the smaller window, and notifying a kernel that new memory has been added, wherein the new memory is a region left after the remap;
    stopping the application requiring the non-kernel use device;
    stopping operations of the non-kernel use device by a device driver; and
    unmapping a buffer from a kernel virtual mapping system.

2. The method of claim 1, further including splitting the hot-add RAM into at least two continuous parts.

3. The method of claim 2, further including remapping at least one of the two continuous parts of the hot-add RAM for use by DMA memory of the non-kernel use device, wherein the new memory is at least one of the two continuous parts.

4. The method of claim 3, further including signaling the kernel of the addition of the hot-add RAM.

5. The method of claim 4, further including performing at least one of:
    scanning the at least one of the two continuous parts of the hot-add RAM by the kernel,
    perceiving that the least one of the two continuous parts of the hot-add RAM is newly added, and
    adding the least one of the two continuous parts of the hot-add RAM to a pool of general purpose memory.

6. The method of claim 5, further including configuring the non-kernel use device with the buffer of the least one of the two continuous parts of the hot-add RAM.

7. A system for efficient reclamation of pre-allocated direct memory access (DMA) memory in a computing environment, the system comprising:
    at least one processor device operable in the computing environment, wherein the at least one processor device:
        emulates a hot-add random access memory (RAM) for a general purpose use by reclamation of pre-allocated DMA memory reserved at boot time by notifying a non-kernel use device user that the non-kernel use device has a smaller window, stopping and remapping to the smaller window, and notifying a kernel that new memory has been added, wherein the new memory is a region left after the remap,
        stops the application requiring the non-kernel use device,
        stops operations of the non-kernel use device by a device driver, and
        unmaps a buffer from a kernel virtual mapping system.

8. The system of claim 7, wherein the at least one processor device splits the hot-add RAM into at least two continuous parts.

9. The system of claim 8, wherein the at least one processor device remaps at least one of the two continuous parts of the hot-add RAM for use by DMA memory of the non-kernel use device, wherein the new memory is at least one of the two continuous parts.

10. The system of claim 9, wherein the at least one processor device signals the kernel of the addition of the hot-add RAM.

11. The system of claim 10, wherein the at least one processor device performs at least one of:
    scanning the at least one of the two continuous parts of the hot-add RAM by the kernel,
    perceiving that the least one of the two continuous parts of the hot-add RAM is newly added, and
    adding the least one of the two continuous parts of the hot-add RAM to a pool of general purpose memory.

12. The system of claim 11, wherein the at least one processor device configuring the non-kernel use device with the buffer of the least one of the two continuous parts of the hot-add RAM.

13. A computer program product for efficient reclamation of pre-allocated direct memory access (DMA) memory using a processor device, the computer program product comprising a non-transitory computer-readable storage medium having computer-readable program code portions stored therein, the computer-readable program code portions comprising:
    a first executable portion that emulates a hot-add random access memory (RAM) for a general purpose use by reclamation of pre-allocated DMA memory reserved at boot time by notifying a non-kernel use device user that the non-kernel use device has a smaller window, stopping and remapping to the smaller window, and notifying a kernel that new memory has been added, wherein the new memory is a region left after the remap; and
    a second executable portion that stops the application requiring the non-kernel use device,
    stops operations of the non-kernel use device by a device driver, and
    unmaps a buffer from a kernel virtual mapping system.

14. The computer program product of claim 13, further includes a third executable portion that performs at least one of:
    splitting the hot-add RAM into at least two continuous parts, and
    remapping at least one of the two continuous parts of the hot-add RAM for use by DMA memory of the non-kernel use device, wherein the new memory is at least one of the two continuous parts.

15. The computer program product of claim 14, further includes a fourth executable portion that signals the kernel of the addition of the hot-add RAM.

16. The computer program product of claim 15, further includes a fifth executable portion that performs at least one of:
    scanning the at least one of the two continuous parts of the hot-add RAM by the kernel,
    perceiving that the least one of the two continuous parts of the hot-add RAM is newly added, and
    adding the least one of the two continuous parts of the hot-add RAM to a pool of general purpose memory.

17. The computer program product of claim 16, further includes a sixth executable portion that configures the non-kernel use device with the buffer of the least one of the two continuous parts of the hot-add RAM.

* * * * *